US009481502B2

(12) United States Patent
Bosetti et al.

(10) Patent No.: US 9,481,502 B2
(45) Date of Patent: Nov. 1, 2016

(54) BIODEGRADABLE ONE-WAY VENTING VALVE FOR AN AIRTIGHT CONTAINER

(75) Inventors: Osvaldo Bosetti, Varese (IT); Franco Goglio, Milan (IT)

(73) Assignee: GOGLIO S.P.A., Milan (IT)

( * ) Notice: Subject to any disclaimer, the term of this patent is extended or adjusted under 35 U.S.C. 154(b) by 154 days.

(21) Appl. No.: 13/576,005

(22) PCT Filed: Dec. 22, 2010

(86) PCT No.: PCT/EP2010/070498
§ 371 (c)(1),
(2), (4) Date: Jul. 30, 2012

(87) PCT Pub. No.: WO2011/091924
PCT Pub. Date: Aug. 4, 2011

(65) Prior Publication Data
US 2012/0298658 A1    Nov. 29, 2012

(30) Foreign Application Priority Data

Jan. 29, 2010    (EP) ..................... 10425017

(51) Int. Cl.
| | | |
|---|---|---|
| *B65D 51/16* | (2006.01) | |
| *B65D 77/22* | (2006.01) | |
| *B65D 65/46* | (2006.01) | |

(52) U.S. Cl.
CPC ........... *B65D 77/225* (2013.01); *B65D 65/466* (2013.01); *Y02W 90/13* (2015.05); *Y10T 137/7837* (2015.04)

(58) Field of Classification Search
CPC ...... B65D 51/16; B65D 65/46; B65D 77/22; B65D 81/26; B65D 65/466; B65D 77/225; Y02W 90/13; Y02W 90/14; C08L 2201/06; B32B 2307/7163
USPC ............ 220/203.29, DIG. 30; 137/246, 550, 137/855, 533.31, 533.13; 256/356, 366, 256/268; 383/1, 103; 426/118
See application file for complete search history.

(56) References Cited

U.S. PATENT DOCUMENTS

| | | | |
|---|---|---|---|
| 3,595,467 A |  | 7/1971 | Goglio |
| 3,799,427 A | * | 3/1974 | Goglio .......................... 383/103 |
| 6,468,332 B2 | * | 10/2002 | Goglio et al. ................... 96/134 |
| 6,893,527 B1 | * | 5/2005 | Doane et al. ............. 156/244.11 |
| 7,422,780 B2 | * | 9/2008 | Suzuki .......................... 428/35.7 |
| 8,187,514 B2 | * | 5/2012 | Ozasa et al. .................. 264/266 |
| 2007/0122584 A1 | * | 5/2007 | Song ......................... B32B 5/16 428/71 |
| 2009/0169693 A1 | * | 7/2009 | Hoffman ........................ 426/395 |

(Continued)

FOREIGN PATENT DOCUMENTS

| | | |
|---|---|---|
| DE | 10 2007 029315 | 11/2008 |
| EP | 0 659 657 | 6/1995 |

(Continued)

*Primary Examiner* — Shawn M Braden
(74) *Attorney, Agent, or Firm* — Pearne & Gordon LLP

(57) ABSTRACT

The present invention concerns a venting valve for a container (1) adapted to contain gas-releasing products comprising a valve body (2A) and a one-way valve member (4) movable between a first configuration and a second configuration, said valve member (4) being associated with said valve body (2A). Particularly the valve body (2A) is formed from a biodegradable material and said movable valve member (4) is a combination of at least one biodegradable material and at least one non biodegradable material.

17 Claims, 4 Drawing Sheets

(56) References Cited

U.S. PATENT DOCUMENTS

| | | |
|---|---|---|
| 2010/0002961 A1 | 1/2010 | Tanaka et al. |
| 2012/0298658 A1 | 11/2012 | Bosetti et al. |

FOREIGN PATENT DOCUMENTS

| | | |
|---|---|---|
| EP | 1 213 228 | 6/2002 |
| JP | H02269666 A | 11/1990 |
| JP | H04311460 A | 11/1992 |
| JP | H0717567 A | 1/1995 |
| JP | H07315433 A | 12/1995 |
| JP | H11130907 A | 5/1999 |
| JP | 2006096363 A | 4/2006 |
| JP | 2006232295 A | 9/2006 |
| JP | 2007277383 A | 10/2007 |
| WO | 2009011060 | 1/2009 |
| WO | 2011091924 | 8/2011 |

* cited by examiner

BIODEGRADABLE ONE-WAY VENTING VALVE FOR AN AIRTIGHT CONTAINER

This application is the U.S. national phase of International Application No. PCT/EP 2010/070498 filed 22 Dec. 2010which designated the U.S. and claims priority to EP 10425017.0 filed 29 Jan. 2010, the entire contents of each of which are hereby incorporated by reference.

The present invention relates to a biodegradable one-way venting valve for an airtight container according to the preamble of claim 1.

Particularly, but without limitation, the airtight container is suitable for use in container products that release gases during storage, i.e. products that tend to outgas during storage.

Examples of these products are aromatic or scented products, powdered products, such as coffee, detergents, fertilizers, but also liquid products, fresh pasta or the like.

Venting valves of the above mentioned type are known in the art, for instance from patents U.S. Pat. No. 3,595,467, EP0659657 or EP1213228, which are intended for use in containers of such products.

Particularly, these valves are typically associated with a wall of a container, and are designed to allow venting of gases released from the product in the container. This container is hermetically sealed and the valve prevents overpressures from building up therein, causing the container to swell and eventually break, and also prevents the ingress of air into the container, which would affect product quality.

Currently available venting valves can accomplish this task by causing the container to open as soon as a slight internal overpressure is established, and to close when such overpressure ceases.

Prior art venting valves are formed from thermoplastic materials, such as polyethylene-based polymers.

Similar materials are used to also form the laminates of the containers, with which such valves are intended to be associated.

A common technique for securing the valve to the container consists in attaching a sealing film to the inner layer of the container. A polyolefin film is usually employed as a sealing film.

The combination of the valve and container provides a package suitable for storage of the above mentioned products.

The packages so obtained are highly advantageous but still have drawbacks concerning disposal, due to the materials of which they are composed.

Particularly, the thermoplastic materials that are used to form both the valve and/or the container are neither biodegradable nor compostable.

In view of obviating this problem, containers have been introduced whose laminates are formed from biodegradable materials, but this has not been enough to state that the package is generally biodegradable.

This is because no one-way venting valve is currently available that is formed from biodegradable materials.

Therefore, should a package include a container formed of biodegradable materials, it still could not be qualified as a biodegradable package because the valve has no biodegradability.

In view of the above described prior art, the object of the present invention is to provide a biodegradable one-way venting valve that might be associated with a hermetically sealed container, also formed with biodegradable materials.

Particularly, the technical problem is the provision of a package that might be qualified as biodegradable.

A further technical problem is the provision of a biodegradable valve that has the same technical operation features of a valve formed from non biodegradable materials.

According to the present invention, this object is fulfilled by a venting valve for containers of aromatic or scented products as defined in claim 1.

This object is also fulfilled by an airtight container for products that release scented or aromatic gases, which incorporates a venting valve as defined in claim 14.

Thus, the present invention provides a biodegradable venting valve for containers made of biodegradable materials.

For instance, the valve of the present invention finds application in airtight containers of gas-releasing products, or in containers that are required to relieve pressure accumulated therein (e.g. where multiple airtight bags, for instance containing concrete, are stacked: the mechanical pressure generated upon stacked bags causes overpressure therein, which has to be relieved, to prevent the bags from breaking).

The present invention provides a one-way venting valve formed from biodegradable materials that can ensure the same operation features and properties (weight, opening pressure, closing pressure, air flow, sealability to the laminate of the container, etc.) as a venting valve formed from non-biodegradable materials of the currently available type.

Advantageously, both the venting valve and the container are formed using biodegradable materials whose characteristics fulfill the specifications of EN 13421 or the equivalent specifications ISO 14855-1:2005 or the equivalent specifications ASTM D6400-04.

As per the specifications EN 13421, it represents a harmonized standard and it has been included in the Official Journal of the European Union so as to provide a presumption of conformity with the European Directive 94/62EC on packaging and packaging waste.

The characteristics and advantages of the invention will appear from the following detailed description of one practical embodiment, which is illustrated without limitation in the annexed drawings, in which.

In the course of this description, the term biodegradable means the series of irreversible chemical reactions by which in nature, or even under artificial conditions, there is the decomposition of a substance. The level of biodegradation to reach to be included in the certification of biodegradable material is at least 90% to be achieved in no more than 6 months.

The term composting is the process that occurs naturally in the particular conditions of temperature and humidity (in the so-called composter) at the end of which a waste is converted into a substance called compost. A waste to be declared as compostable according to the specifications of the standard EN 13432, must meet the following criteria: a) to be biodegradable in no more than 6 months at least 90%, b) disintegration, fragmentation and loss of visibilty in the final compost. The mass of the residues of the waste material with size greater than 2 mm must be less than 10% of the initial mass c) low levels of heavy metals and no adverse effects on the quality of compost, d) stability of pH values, salt content, volatile solids, N, P, Mg, K.

It should be immediately noted that the degassing valve described below is a biodegradable valve and preferably it is also compostable.

Referring to the annexed figures, numeral 1 generally designates a container, e.g. a flexible or semirigid airtight container.

Figure 1:
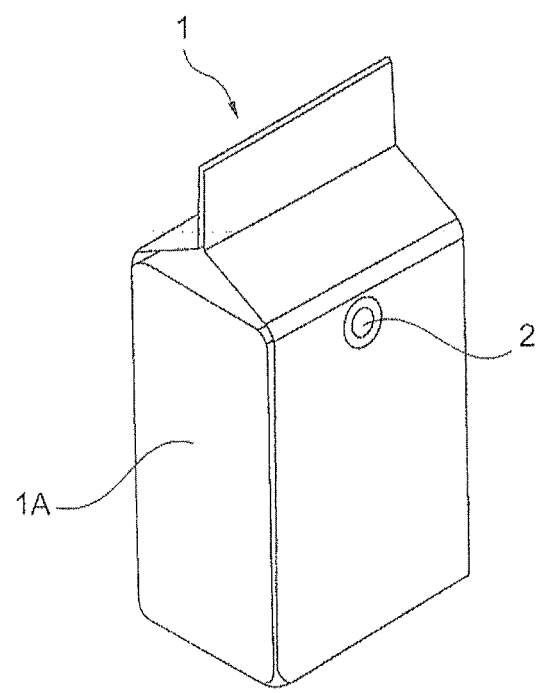
FIG. 1 is a diagrammatic axonometric view of an airtight container having a venting valve according to the present invention.

A one-way venting valve 2 is provided in the container 1, which valve is associated, for instance, to a wall 1A of the container 1 (in FIG. 1 the venting valve 2 is shown in association with a front wall).

The walls 1A of the airtight container 1 may be formed with a laminate composed of a biodegradable material selected from the group comprising biodegradable materials such as corn starch, potato flour, cellulose, Mater-Bi and/or any combination thereof, and according to the technical specifications of the international standard EN 13432.

Whenever overpressure builds up in the container 1 due to fermentation of the products contained therein or to mechanical pressure exerted on the laminate of the container, the venting valve 2 allows gases to be exhausted therefrom to preserve the integrity of the container 1.

Here, for controlled relief of overpressure, a hole 3 is formed in the laminated materials of the container walls 1.

Preferably, the one-way venting valve 2 is associated below such hole 3, by heat sealing or ultrasound techniques.

Figure 2:
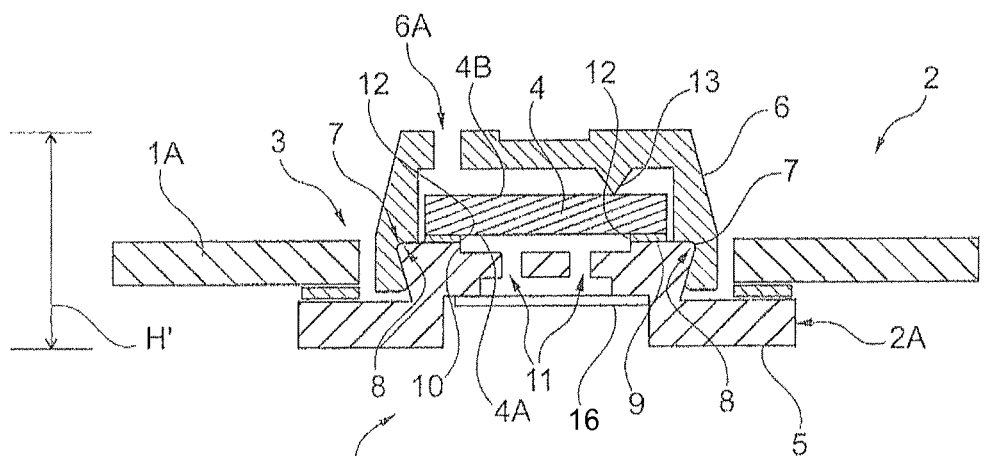
FIG. 2 is a diagrammatic cross-sectional view of a first embodiment of the valve of the present invention, when associated with the container of FIG. 1, only part of the latter being shown.

Referring to FIG. 2, a first embodiment of the one-way venting valve 2 is shown, which is particularly but without limitation suitable for use in airtight containers 1 adapted to contain outgassing products and/or to relieve overpressures possibly generated by mechanical pressure upon the container.

Although this is not expressly shown in such FIG. 2, the venting valve 2 is designed to be covered by the laminate 1A of the container 1.

The valve 2 of the type exemplified in FIG. 2 comprises a valve body 2A and a movable valve member 4 associated with the valve body 2A.

Particularly, the valve body 2A comprises a base plate 5 and a cap 6, the latter being associated with the base plate 5 in closing relationship and having a vent hole 6A.

The cap 6 has an annular groove 7 at an end part thereof, which engages with a mating annular projection 8 located in a mating position on the base plate 5. A flat annular wall 9 is provided above the annular projection 8, and surrounds a central disk 10 having a plurality of holes 11.

The movable valve member 4 is placed between the cap 6 and the base plate 5. This movable valve member 4 acts as a diaphragm and is movable between a first closed configuration and a second venting configuration, as further described below.

The bottom of the base plate 5 may be advantageously shaped to form a housing 14 that might accommodate, as needed, a filter 16 below the central disk 10.

It shall be noted that, in an alternative embodiment, not shown, the filter 16 may be contained in a housing formed in the valve body 2A, i.e. a housing formed in the plate 5.

The peripheral portion of the movable valve member 4 abuts against the annular flat wall 9 of the plate 5, where a viscous layer 12 is preferably provided to ensure a better seal of the movable valve member 4.

In the embodiment of FIG. 2, a movable valve member 4 is pressed against the base plate 5 by a counteracting protrusion 13 formed in the wall opposite the one with the annular groove 7 of the cap 6.

Figure 3A:
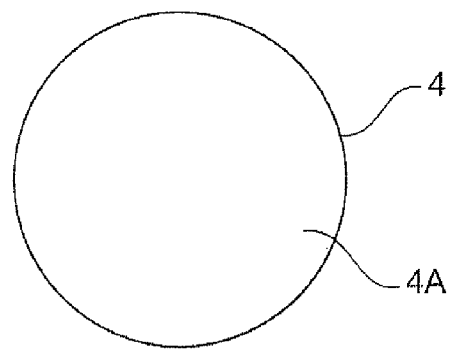
FIGS. 3A and 3B are a plan view and a cross sectional view respectively of a member of the valve of FIG. 2 according to the present invention.
Figure 3B:
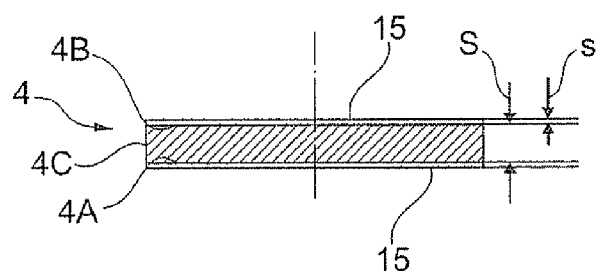

Also referring to FIGS. 3A and 3B, i.e. a plan view and a cross sectional view of the movable valve member 4, the movable valve member 4 is shown as a disk.

The disk has a first surface 4A and a second surface 4B preferably opposite and parallel to each other and a connecting wall 4C having a thickness "S".

The plan section of the first surface 4A and the second surface 4B has a circular shape and the thickness "S" is in a range from 0.2 to 1.2 mm.

Particularly, in the closed configuration of the movable valve member 4, the first surface 4A is in contact with the flat wall of the base plate 5, whereas the second surface 4B faces towards the laminate 1A.

The surface 4A of the movable valve member 4 has such an extension as to cover the holes 11 in the central disk 10.

According to the operation of the valve 2 as shown in FIG. 2, in the first sealed operating configuration, the movable valve member 4 abuts against the flat wall 9 of the plate 5 to seal and prevent the exit of gases from the container 1 or the ingress of air into the container 1.

In case of overpressures in the container 1, the movable valve member 4 lifts up from the flat wall 9 and moves to the second venting operating configuration, in which the gases within the container 1, e.g. released due to the fermentation of the products contained therein, can be vented.

It shall be noted that the presence of the counteracting protrusion 13 acts as a retention upon the movable valve member 4, to prevent separation of the movable valve member 4 from the flat wall 9 of the plate 5.

Particularly, the gases flow through the holes 11, through the air gap created between the movable valve member 4 and the plate 5, and through the hole 6A in the cap 6 into the environment.

As soon as the overpressure state is relieved, the movable valve member 4 moves back into its first configuration, i.e. down to abutment against the flat wall 9, to prevent the ingress of air into the container, following an inverse path to that described above.

A filter 16 is used to prevent occlusion of the holes 11, e.g. due to the presence of fine particulate matter released from the products in the container 1, or abutment of the movable valve member 4 against the wall 9, still due to this particulate matter.

Advantageously, in a preferred embodiment, the venting valve 2 is formed from biodegradable materials of the type complying with the technical specifications of EN 13432.

In other words, the valve body 2A, the base plate 5, the cap 6 and the central disk 10 are formed each with at least one biodegradable material, for compliance with EN 13432.

The movable valve member 4 is also formed from at least one biodegradable material, for compliance with EN 13432.

The term biodegradable material is particularly intended to designate products selected from the group comprising corn starch, potato flour or synthetic bio-polymers and/or any combination of these materials complying with EN 13432.

It shall be noted that the filter 16 may be also formed from a biodegradable 5 material, such a filter paper, cellulose or similar materials.

Preferably, the viscous layer 12 will also be formed from a biodegradable material, such a vegetable oil, a silicone oil or similar materials.

A one-way venting valve 2 is thus provided, formed from biodegradable materials having identical operation features or properties as a venting valve formed from non biodegradable materials, like those available at present.

Figure 4:
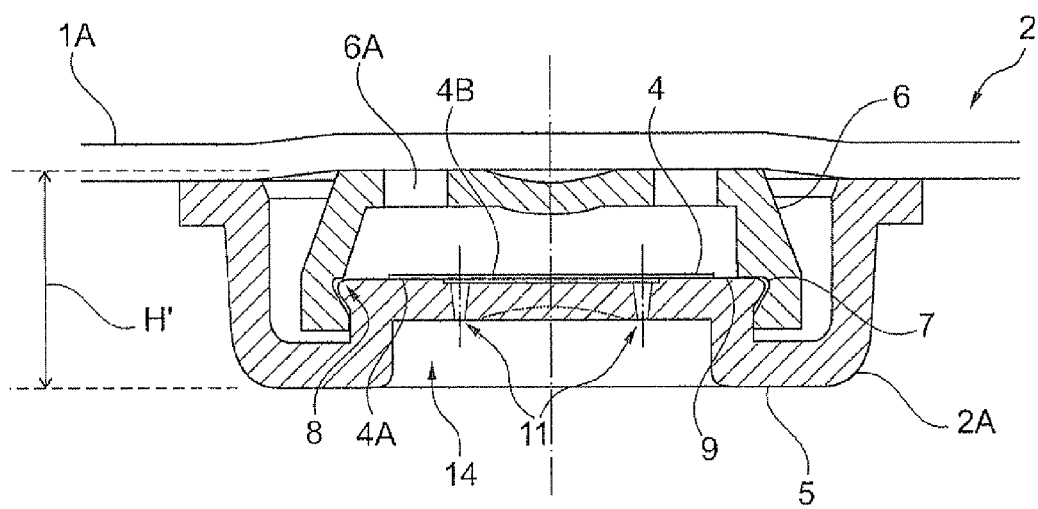
FIG. 4 is a diagrammatic cross-sectional view of a second embodiment of the valve of the present invention, when associated with the container of FIG. 1, only part of the latter being shown.

Referring now to FIG. 4, there is shown a second embodiment of the one-way venting valve 2 adapted to be associated with airtight containers 1 of the type in which pressures may be lower than those that can be obtained with the valve described with reference to FIG. 2.

In FIG. 4, in which the elements described above are designated by identical reference numerals, the valve 2 is shown to have neither the counteracting protrusion 13 nor the filter 16.

Indeed, in this second embodiment, the movable valve member 4 is retained in its first closed operating configuration simply by the inherent surface tension of the viscous layer 12.

Hence, the surface tension of the viscous layer 12 ensures that the movable valve member 4 abuts against the flat wall 9 in the first operating configuration, thereby ensuring a sealing action both against the exit of gases from the container 1 and against the ingress of air from the environment.

In the second embodiment of the valve 2, the action of filtering impurities, which are expelled during gas venting, is accomplished by the particular conformation of vent holes 11.

Thus, in the second embodiment of the valve 2, the holes 11 are formed with a frustoconical shape, where the apex of the cone faces towards the interior of the container 1 and the base of the cone faces towards the movable valve member 4.

Figure 7A:
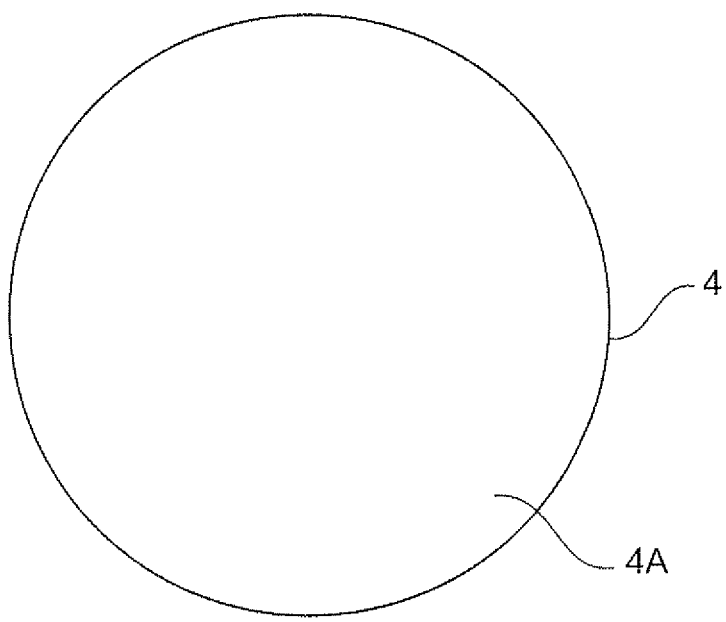
FIGS. 7A and 7B are a plan view and a cross sectional view respectively of a member of the valves of FIGS. 4 to 6 according to the present invention.
Figure 7B:
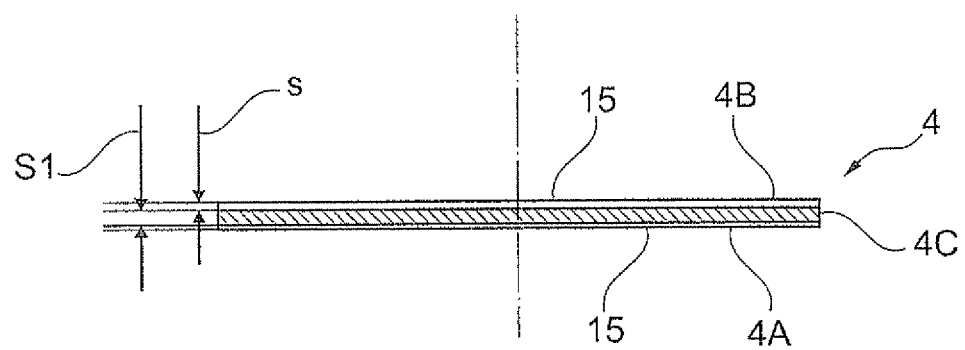

The movable valve member 4, also referring to FIGS. 7A and 7B, in this second embodiment, is in the form of a thin film.

In the film the first surface 4A and the second surface 4B are preferably opposite and parallel to each other and the connecting wall 4C has a thickness "S1" smaller than the thickness "S".

The plan section of the first surface 4A and the second surface 4B has a circular shape and the thickness "S1" is in a range from 0.012 to 0.2 mm.

The biodegradable materials that are used to form the elements of the venting valve 2 of this second embodiment are selected in view of complying with the specifications of EN13432.

Again in this second embodiment, the movable valve member 4 may be wholly formed from a biodegradable material, for compliance with EN 13432.

Figure 5:
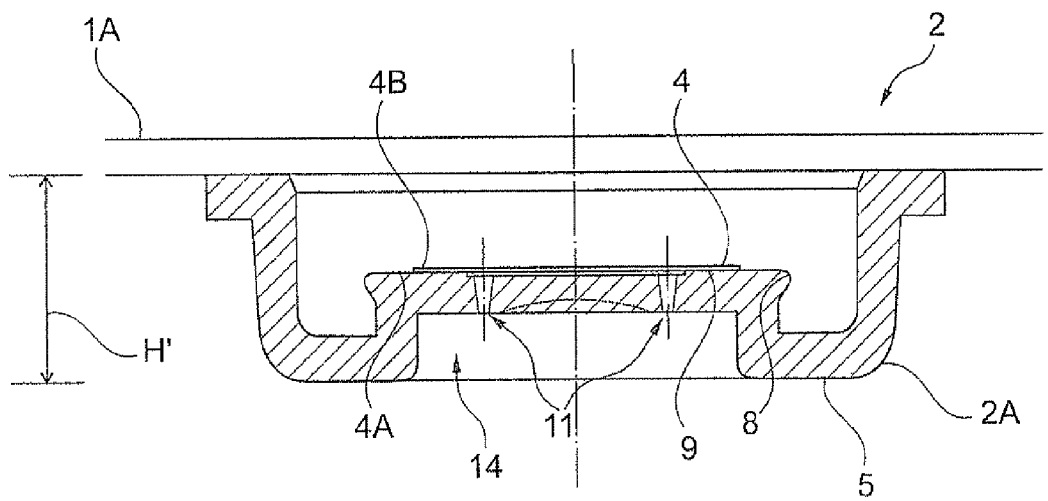
FIG. 5 is a diagrammatic cross-sectional view of a third embodiment of the valve of the present invention, when associated with the container of FIG. 1, only part of the latter being shown.

Referring now to FIG. 5, there is shown a third embodiment of the one-way venting valve 2, which is particularly but without limitation adapted to be associated with airtight containers 1 of the type in which pressures may be lower than those that can be obtained with the valve described with reference to FIG. 2.

This FIG. 5, in which the elements described above are designated by identical reference numerals, shows that the movable valve member 4 of the third embodiment of the valve 2 has neither the cap 6 (included in the venting valves as shown with reference to FIGS. 2 and 4) nor the protrusion 13 (included in the venting valve of FIG. 2).

In fact, the valve 2 is closed by the laminate 1A of the container 1, whereas the movable valve member 4 covers and closes the holes 11 in the plate 10.

In this third embodiment, the movable valve member 4 is retained in the first closed configuration simply by the inherent surface tension of the viscous layer 12.

It shall be noted that in the third embodiment of the valve 2, the movable valve member 4 is in the form of a thin film as described with reference to FIGS. 7A and 7B.

Particularly, the surface 4A of the film has an extension equal to or larger than the surface extension of the flat annular wall 9.

It shall be further noted that the third embodiment of the valve 2 also does not include the filter 16 (that was provided in the venting valve of FIG. 2), because the filtering action is accomplished by the particular conformation of the vent holes 11.

The conformation of the holes 11 in the third embodiment of the valve 2 is preferably similar to that of the second embodiment of the valve 2.

Again in this third embodiment of the valve 2, the movable valve member 4 may be wholly formed from a biodegradable material, for compliance with EN 13432.

Once more, in this third embodiment, the biodegradable materials that are used to form the other elements of the one-way venting valve 2 are selected for compliance with EN 13432.

Figure 6:
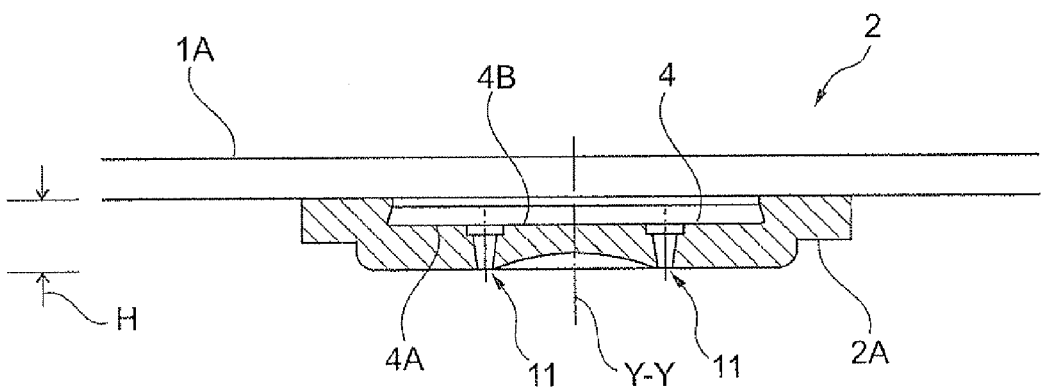
FIG. 6 is a diagrammatic cross-sectional view of a fourth embodiment of the valve of the present invention, when associated with the container of FIG. 1, only part of the latter being shown.

Referring now to FIG. 6, there is shown a fourth embodiment of the valve 2, which is particularly but without limitation adapted to be associated with airtight containers 1 in which pressures may be lower than those that can be obtained with the valve described with reference to FIG. 2.

This FIG. 6, in which the elements described above are designated by identical reference numerals, shows that the fourth embodiment of the valve 2 is very similar to that as shown in FIG. 5, excepting the particular conformation of the valve body 2A.

Particularly, in the fourth embodiment of the valve 2, the valve body 2A is designed to have a height extension H, along a reference vertical axis Y-Y, smaller than the height extension H' of the other embodiments, which provides a valve of a smaller size, more easily fitted to containers having a small-volume storage chamber.

Preferably, the height extension H of this fourth embodiment of the venting valve 2 is more than 50% smaller than the height extension H' of the other embodiments of the venting valve 2 as shown with reference to FIGS. 2, 4 and 5.

Again in this fourth embodiment of the valve 2, the movable valve member 4 may be wholly formed from a biodegradable material, for compliance with EN 13432.

Once more, in this fourth embodiment, the biodegradable materials that are used to form the other elements of the one-way venting valve 2 are selected for compliance with EN 13432.

During the tests conducted to assess the reliability and performances of the venting valve 2, the present inventors found an unexpected problem in integrally forming the movable valve member 4 from at least one biodegradable material.

Particularly, as described above, the movable valve member 4 preferably has the form of a disk with a thickness in a range from 0.2 to 1.2 mm (the disk of FIGS. 3A and 3B), or a thin film, with a thickness in a range from 0.012 to 0.2 mm (the film of FIGS. 7A and 7B).

The above tests unexpectedly revealed that the biodegradable material with which the movable valve member 4 is formed, is exposed to performance degradation with time.

It was thus ascertained that, due to the small thickness of the disk and/or film, the movable valve member 4 cannot ensure the required gastight conditions both into and out of the container 1 and hence proper operation of the valve cannot be guaranteed.

The inventors believe that the problem is that, due to exposure to gases released from the products in the container 1, the disk and/or film of the movable valve member 4 undergoes a fast ageing process.

This is probably caused by the presence of water molecules in the gases released from the products, which molecules are absorbed by the disk and/or film with which the movable valve member 4 is formed, and thus start an undesired process of degradation of the biodegradable material.

This degradation process may affect the ability of the movable valve member 4 to open in response to slight internal overpressures and to immediately reclose as these overpressures cease.

The rapidity of this degradation process depends on the type of product in the container 1 and may be in a range from a few hours to several months.

Therefore, in some cases the movable valve member 4, although formed from biodegradable materials, is unaffected by the degradation process (for instance because there are no outgassing products in the container, the valve 2 being required to accomplish a venting action in response to mechanical pressure exerted on the container) and in other cases, the same movable valve member 4 is subjected to more or less rapid performance degradation, thereby affecting the airtightness of the container 1.

In other words, the longer the time that the products are stored in the container 1, the more the biodegradable material that preferably forms the movable valve member 4 is subjected to degradation of its properties.

Nevertheless, this unexpected problem does not affect the other components of the valve 1, i.e. the plate 5, the cap 6, the filter 15 and/or the viscous layer 12, because they probably are much thicker than the disk and/or film of the movable valve member 4 or are insensitive to the gases released.

In view of obviating this unexpected problem, the movable valve member 4 is at least partially formed from a biodegradable material.

It shall be noted that compliance with EN 13432 is ensured even when the biodegradable product (such as the venting valve 2 as a whole) is formed using non biodegradable materials as long as the overall weight of the non biodegradable materials (such as the movable valve member 4) in such product is not higher than 1% of the overall weight of the product (i.e. the venting valve 2 as a whole).

Particularly, the movable valve member 4 comprises a combination of at least one biodegradable material and at least one non biodegradable material.

The term combination of at least one biodegradable material and at least one non biodegradable material indicates, for the purposes of the present invention, that the movable valve member 4 may be:
- a mixture of products with biodegradable and non biodegradable characteristics, or
- a reaction that provides a product with both biodegradable and non biodegradable characteristics, or
- a material with biodegradable characteristics, which has a coating with non biodegradable characteristics.

The combination of at least one biodegradable material and at least one non biodegradable material in the movable valve member 4 of any previous embodiment comprises:
- an amount of biodegradable material equal to or higher than seventy percent (70%) and equal to or lower than ninety-nine percent (99%) by weight, with respect to the weight of the movable valve member 4 and
- an amount of non biodegradable material equal to or lower than thirty percent (30%) and equal to or higher than one percent (1%) by weight, with respect to the weight of the movable valve member 4.

Preferably, the amount of biodegradable material is eighty percent (80%) by weight with respect to the weight of the movable valve member 4 and the amount of non biodegradable material is twenty percent (20%) by weight with respect to the weight of the movable valve member 4.

In other words, assuming that the weight of the movable valve member 4, in either disk or film form, is known or determinable, a particular mixture, reaction and/or product of biodegradable and non biodegradable materials may be obtained, so that the movable valve member 4 is not subjected to performance degradation with time.

The term non biodegradable material with which the movable valve member 4 is formed is intended to designate any type of polymeric material suitable for use in the food-processing and chemical industries and particularly in food-packaging. This polymeric material shall be a non biodegradable material adapted not to react with and/or to be insensitive to the gases released by the products in the container. Such a material that does not react with or is insensitive to the gases released by the products in the container may be either a hydrophobic material or a protective coating (e.g. polyethylene, polypropylene, polyethylene terephthalate, as well as fluorinated polymers).

The term biodegradable material with which the movable valve member 4 is formed is intended to designate any type of biodegradable material complying with the technical specifications as set out in EN 13432, such as a material selected from the group comprising corn starch, potato flour or synthetic biopolymers, and/or any combination thereof.

In a preferred embodiment, also referring to FIGS. 3A, 3B, 7A and 7B, the disk and/or film that constitutes the movable valve member 4 is formed with a biodegradable material as mentioned above, and is at least partially covered by a cover layer 15 of non biodegradable material as mentioned above.

This cover layer 15 is designed to have a thickness "s".

Therefore, by at least partially or wholly covering one of the surfaces 4A, 4B and/or both of the movable valve member 4 (i.e. the disk and/or the film) with a cover layer 15 of non biodegradable material having a thickness "s", a venting valve 2 can be obtained that is wholly comparable, in terms of performances, reliability and safety, to currently available non biodegradable valves.

The thickness "s" of the layer 15 that covers the first surface 4A and/or the second surface 4B of the movable valve member 4 shall fall in a range from 0.5 μm to 2.5 μm, and be preferably 1.5 μm.

It shall be noted that the thickness "s" of the layer 15 of non biodegradable material deposited on the surface 4A, i.e. the surface in contact with the central disk 10 of the valve body 2, may be larger than the thickness of the layer deposited on the surface 4B, as the cover layer "s" disposed on the surface 5 is the one in direct contact with the gases released by the products in the container.

The movable valve element 4 in any of the previous embodiments described with reference to FIGS. 4, 5 and 6, may also have barrier properties to the diffusion through his body of organic and inorganic gases developed by the stored products such as oxygen, CO2 or compounds having low boiling point.

To that end, surface coatings or embedded layers are provided in the body of film of the movable valve element 4. Such surface coatings are suitable for preventing the passage of the above mentioned gases.

Those skilled in the art will obviously appreciate that a number of changes and variants may be made to the arrangements as described hereinbefore to meet specific needs, without departure from the scope of the invention, as defined in the following claims.

The invention claimed is:

1. A one-way venting valve effective for an airtight container (1) containing product, the venting valve comprising
   a valve body (2A) and
   a one-way valve member (4) movable between a first operating configuration and a second operating configuration, said valve member (4) being associated with said valve body (2A);
   wherein said valve body (2A) is formed from a first biodegradable material which complies with ASTM D6400-04 and wherein said valve member (4) comprises a combination of a second biodegradable material which complies with ASTM D6400-04 and a first non biodegradable material
   which is a polymeric material that does not react with and/or is insensitive to gases releasable by the product in the container,
   wherein said valve member (4) has the form of a disk with a thickness in a range from 0.2 to 1.2 mm.

2. A one-way venting valve as claimed in clam 1, wherein said combination of the second biodegradable material and the first non biodegradable material comprises:
   an amount of said second biodegradable material equal to or higher than seventy percent (70%) and equal to or lower than ninety-nine percent (99%) by weight, with respect to the weight of the valve member (4) and
   an amount of said first non biodegradable material equal to or lower than thirty percent (30%) and equal to or higher than one percent (1%) by weight, with respect to the weight of the valve member (4).

3. A one-way venting valve as claimed in claim 2, wherein the amount of said second biodegradable material is eighty percent (80%) by weight with respect to the weight of the valve member (4) and the amount of said first non biodegradable material is twenty percent (20%) by weight with respect to the weight of said valve member (4).

4. A one-way venting valve as claimed in claim 1, wherein said valve member (4) has a thickness (S, SI) and defines a first surface (4A) and a second surface (4B), said first surface (4A) and/or said second surface (4B) being at least partially covered by a cover layer (15) formed with at least one non biodegradable material.

5. A one-way venting valve as claimed in claim 4, wherein said cover layer (15) has a thickness (s) that falls in a range from 0.5 µ to 2.5 µm.

6. A one-way venting valve as claimed in claim 4, wherein said cover layer (15) is formed with at least one non biodegradable material that is a polymeric material that is adapted not to react with and/or to be insensitive to the gases releasable from the product in said container (1), said non biodegradable material of said cover layer (15) being selected from the group consisting of a hydrophobic material and a protective coating providing the protection of polyethylene, polypropylene, polyethylene terephthalate or fluorinated polymers.

7. The one-way venting valve of claim 5 wherein the thickness of the cover layer (15) is 1.5 µm.

8. A one-way venting valve as claimed in claim 1, wherein said valve body (2A) has a base plate (5) having holes (11), said valve member (4) abutting against said base plate (5) in said first operating configuration, to obstruct said holes (11).

9. A one-way venting valve as claimed in claim 8, wherein a viscous layer (12) formed from a third biodegradable material which complies with ASTM D6400-04 is interposed between said base plate (5) and said valve member (4).

10. A one-way venting valve as claimed in claim 8, further comprising a cap (6) associated with said base plate (5) in closing relationship, and having a vent hole (6A), said cap being formed from a fourth biodegradable material which complies with ASTM D6400-04.

11. A one-way venting valve as claimed in claim 8, wherein said base plate (5) has a housing (14) accommodating a filter (16) and a counteracting protrusion (13), said valve member (4) being pressed, in said first operating configuration, against said base plate (5) by said counteracting protrusion (13), said counteracting protrusion (13) and said filter (16) being formed from one or more biodegradable materials which comply with ASTM D6400-04.

12. A one-way venting valve as claimed in claim 9, wherein the third biodegradable material is a vegetable oil.

13. A one-way venting valve as claimed in claim 8, wherein said base plate (5) has a housing (14) accommodating a filter (16) formed of filter paper which complies with ASTM D6400-04.

14. An airtight container (1) containing product and having a one-way venting valve (2), characterized in that said one-way venting valve (2) is as claimed in claim 1.

15. An airtight container (1) as claimed in claim 14, wherein said container is formed from a material selected from the group consisting of corn starch, potato flour, cellulose, Mater-Bi and/or any combination thereof, said material complying with ASTM D6400-04.

16. A one-way venting valve according to claim 1, wherein each of the first and second biodegradable materials is selected from the group consisting of corn starch, potato flour, synthetic bio-polymers and combinations thereof.

17. A one-way venting valve comprising:
   a valve body (2A) and
   a one-way valve member (4) movable between a first operating configuration and a second operating configuration, said valve member (4) being associated with said valve body (2A);
   wherein said valve body (2A) is formed from a first biodegradable material which complies with ASTM D6400-04 and wherein said valve member (4) comprises a combination of a second biodegradable material which complies with ASTM D6400-04 and a material which does not comply with ASTM D6400-04 wherein said valve member (4) has the form of a thin film, with a thickness in a range from 0.012 to 0.2 mm.

* * * * *